US008975780B2

(12) United States Patent
Urban

(10) Patent No.: US 8,975,780 B2
(45) Date of Patent: Mar. 10, 2015

(54) APPLIANCE HAVING AN AUXILIARY POWER INPUT

(76) Inventor: Martin A. Urban, Rockford, IL (US)

( * ) Notice: Subject to any disclaimer, the term of this patent is extended or adjusted under 35 U.S.C. 154(b) by 818 days.

(21) Appl. No.: 13/272,292

(22) Filed: Oct. 13, 2011

(65) Prior Publication Data
US 2013/0093244 A1 Apr. 18, 2013

(51) Int. Cl.
H02J 9/00 (2006.01)
H02J 9/06 (2006.01)
H02J 9/04 (2006.01)

(52) U.S. Cl.
CPC ..... H02J 9/06 (2013.01); H02J 9/04 (2013.01)
USPC ............................................. 307/64; 307/85

(58) Field of Classification Search
USPC ..................................................... 307/64, 85
See application file for complete search history.

(56) References Cited

U.S. PATENT DOCUMENTS

| 4,308,724 | A | * | 1/1982 | La Ginestra | ..................... 62/126 |
| 4,823,554 | A | | 4/1989 | Trachtenberg et al. | |
| 5,668,417 | A | | 9/1997 | Wiscombe et al. | |
| 7,736,179 | B2 | | 6/2010 | Cook et al. | |
| 7,870,753 | B2 | | 1/2011 | Marcy, V et al. | |
| 8,354,582 | B2 | * | 1/2013 | Schroeder et al. | ............ 136/205 |
| 8,742,304 | B2 | * | 6/2014 | Emma | ........................... 219/679 |
| 2009/0045680 | A1 | | 2/2009 | Litch et al. | |
| 2009/0064702 | A1 | * | 3/2009 | Cook et al. | ...................... 62/331 |
| 2009/0212630 | A1 | * | 8/2009 | Flegel et al. | .................... 307/64 |
| 2010/0038966 | A1 | * | 2/2010 | Espeut, Jr. | ..................... 307/68 |
| 2010/0141038 | A1 | | 6/2010 | Chapel et al. | |

OTHER PUBLICATIONS

AcuTemp, Operation & Maintenance, "VaxiCool Mobile Refrigerator/Freezer", An Advanced Technology Vaccine Storage & Transport System, Model VXC-2 Operations Manual, Jun. 2006, 21 pages.
Keith McMillen nstruments, http://www.keithmcmillen.com/stringport/hardware,Hardware, "Stringport Front Panel", last accessed Jul. 28, 2011, 1 page.

* cited by examiner

Primary Examiner — Daniel Cavallari
(74) Attorney, Agent, or Firm — Conley Rose, P.C.; William H. Dietrich

(57) ABSTRACT

An appliance including an electrically-powered system, a primary power input, and an auxiliary power input is provided. The electrically-powered system is disposed within a housing. The primary power input is configured to supply electrical energy to the electrically-powered system. However, the housing generally hampers access to the primary power input after installation of the appliance. Therefore, the auxiliary power input, which is also configured to supply electrical energy to the electrically-powered system, is readily accessible relative to the primary power input after installation of the appliance.

20 Claims, 5 Drawing Sheets

APPLIANCE HAVING AN AUXILIARY POWER INPUT

BACKGROUND

Electrically-operated devices (e.g., household appliances) generally equipped with a power plug disposed at the end of a power cord. When the power plug is inserted into an electrical outlet or socket, electrical energy from a power supply is transferred to the electrically-operated device and the electronically-operated device is able to function as intended.

BRIEF DESCRIPTION OF THE DRAWINGS

The accompanying drawings incorporated in and forming a part of the specification illustrate several aspects of the present disclosure and, together with the description, serve to explain the principles of the present disclosure. In the drawings.

DETAILED DESCRIPTION OF THE DRAWINGS

Figure 1:
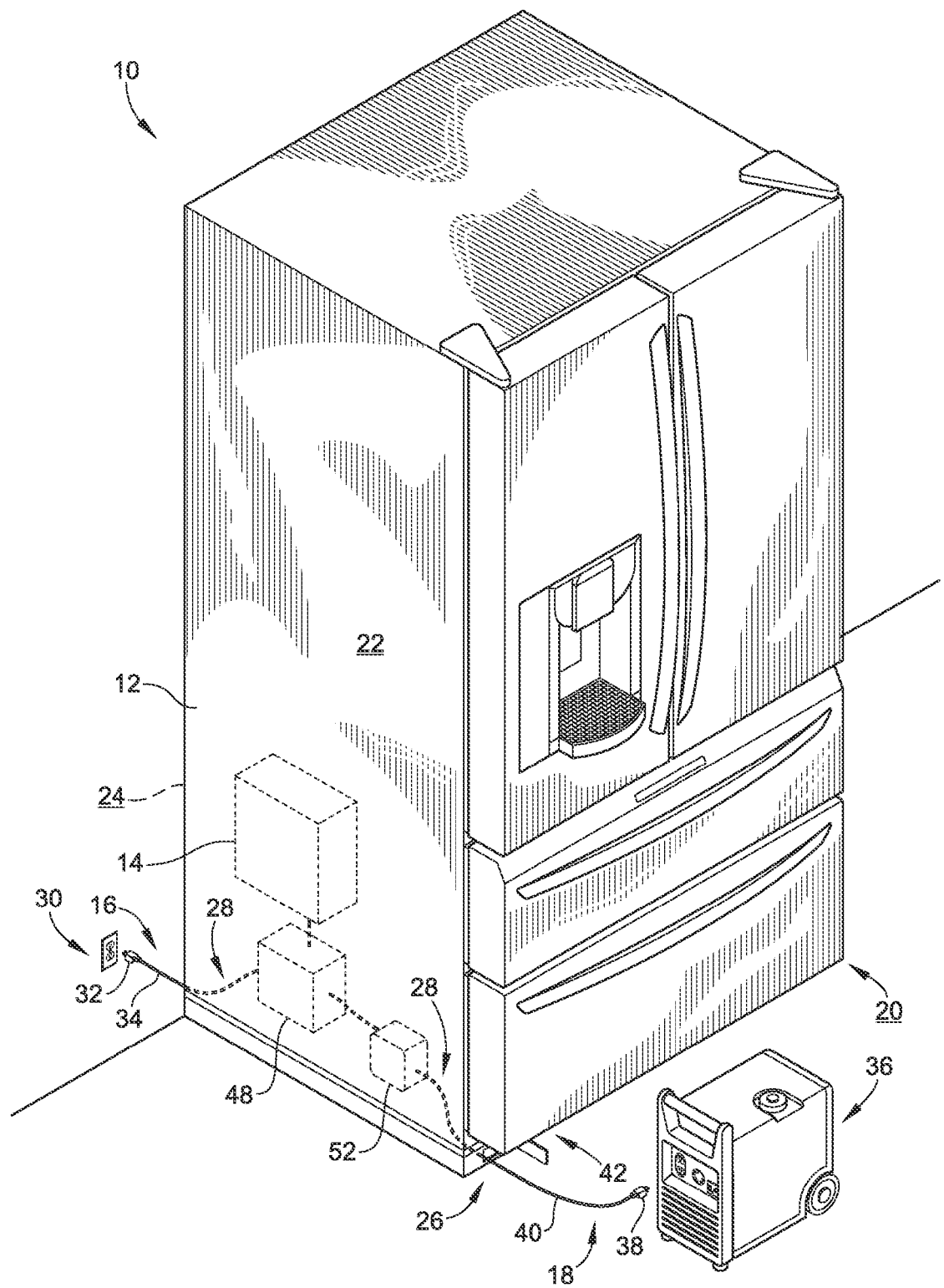
FIG. 1 is a perspective view of an appliance with both a primary power input and an auxiliary power input.

Referring now to FIG. 1, an appliance 10 (e.g., a household appliance) is illustrated. As will be more fully explained below, the appliance 10 is configured to enable auxiliary power to be quickly and easily electrically provided to the appliance in the event of a power loss (e.g., due to a blackout, inclement weather, etc.). As such, food spoliation may be prevented, a comfortable temperature inside a residence may be maintained, or a supply of fresh water may be maintained despite the loss of primary power from a primary power supply.

Figure 2:
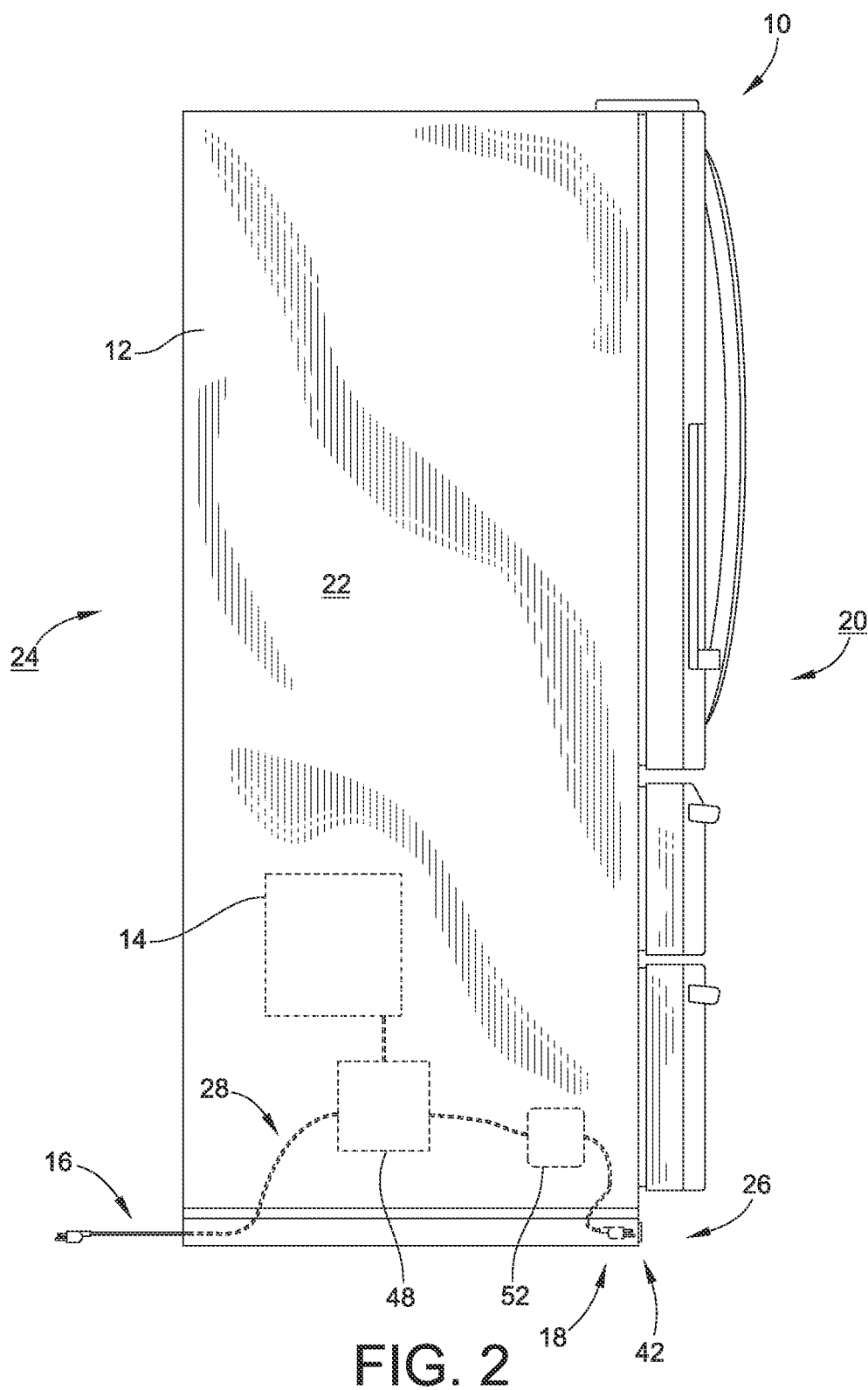
FIG. 2 is a side elevation view of the appliance of FIG. 1.
Figure 3:
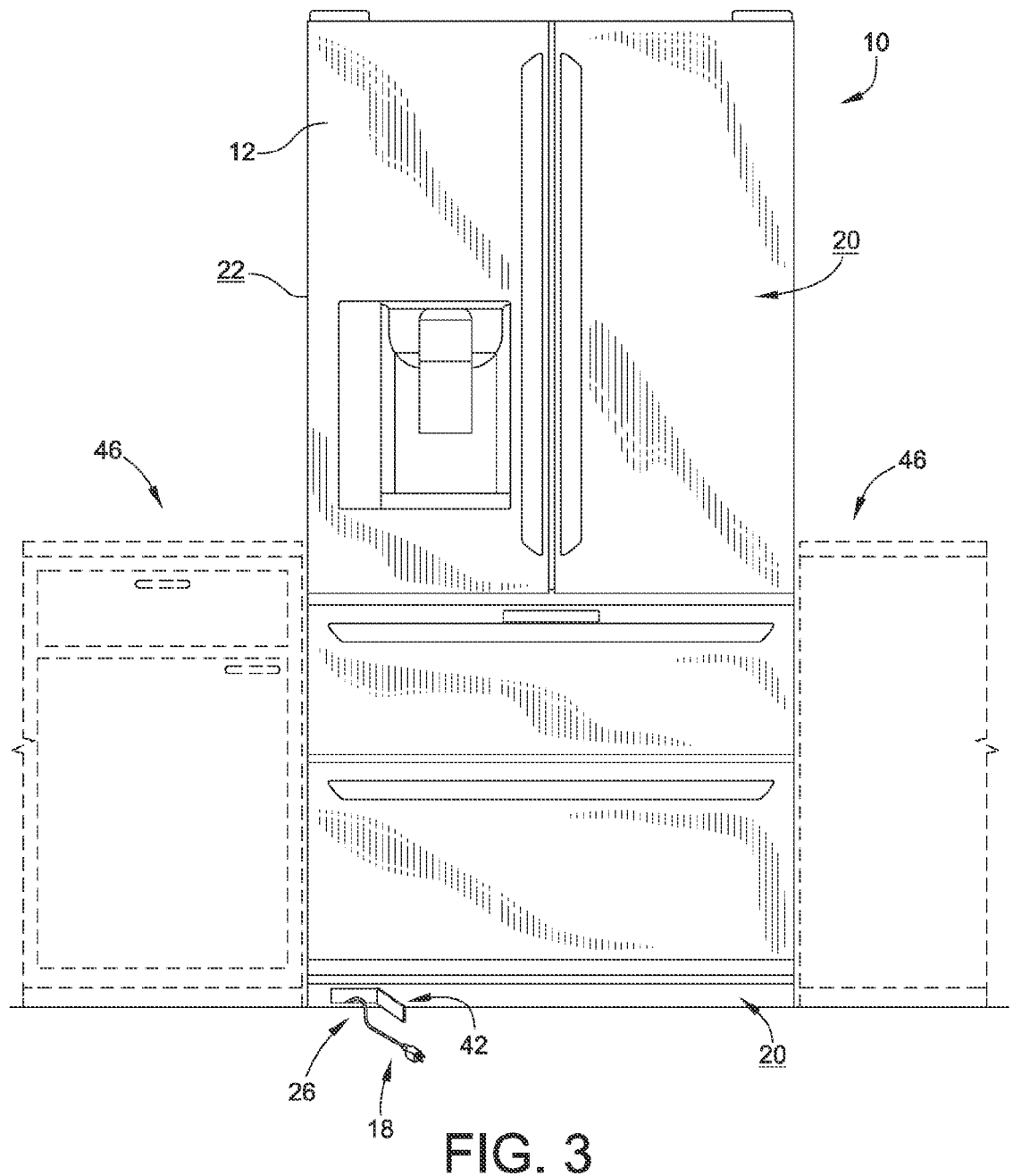
FIG. 3 is a front elevation view of the appliance of FIG. 1 installed in a countertop cabinet.

In some embodiments as illustrated in FIGS. 1-3, the appliance 10 is a combination refrigerator/freezer. As shown, the appliance 10 includes a housing 12, an electrically-powered system 14, a primary power input 16, and an auxiliary power input 18.

The housing 12 defines a front face 20 generally directed toward and accessible by a user of the appliance 10 during normal operation and use of the appliance 10. The housing 12 also defines several other faces such as, for example, one or more side faces 22 and a rear face 24. Depending on the configuration of the appliance 10, other faces, sides, or surfaces may also be present and defined.

Still referring to FIGS. 1-2, in some embodiments the housing 12 includes an access panel 26. In some embodiments, the access panel 26 is a pivotable door or a temporarily removable and replaceable grill. While the access panel 26 is situated on the front face 20 of the housing 12 in FIGS. 1-2, in some embodiments the access panel 26 may be disposed on one or more of the side faces 22.

The electrically-powered system 14 is generally supported by the housing 12. In some embodiments as shown in FIGS. 1-2, the electrically-powered system 14 is disposed within the housing 12. Depending on the type of appliance 10, the electrically-powered system may be, for example, a refrigeration unit, a heating mechanism, a pump, and the like.

The primary power input 16 is generally electrically coupled to the electrically-powered system 14 via electrical wiring 28. As such, the primary power input 16 is configured to supply electrical energy received from a primary power supply 30 (e.g., a wall outlet or socket) to the electrically-powered system 14. In some embodiments, the primary power input 16 is accessible from the rear face 24 of the housing 12. As shown in FIGS. 1-2, in some embodiments the primary power input 16 is a power plug 32 disposed at the distal end of a length of electrical cord 34 extending from the rear face 24 of the housing 12.

The auxiliary power input 18 is also generally electrically coupled to the electrically-powered system 14 via electrical wiring 28. As such, the auxiliary power input 18 is configured to supply electrical energy received from an auxiliary power supply 36 (e.g., a generator) to the electrically-powered system 14 during, for example, a power loss or disruption in power. In some embodiments, the auxiliary power input 18 is accessible from the front face 20 of the housing 12 or the side face 22 of the housing 12 adjacent to the front face 20. As shown in FIGS. 1-2, in some embodiments the auxiliary power input 18 is a power plug 38 disposed at the distal end of a length of electrical cord 40 extending from the front face 20 or the side face 22 of the housing 12.

As illustrated in FIG. 2, the auxiliary power input 18 may be hidden behind the access panel 26 when not in use, yet quickly and easily accessed when desired. In some embodiments, the auxiliary power input 18 is enabled and the primary power input 16 is disabled when the access panel 26 is placed in an open position 42 as shown in FIG. 1. In some embodiments, the auxiliary power input 18 is disabled when the access panel 26 is placed in a closed position 44 as shown in FIG. 2.

Referring now to FIG. 3, the appliance 10 is depicted built into or disposed within a countertop or cabinet 46 (shown in dashed lines). When installed in this manner, the housing 12 of the appliance 10 completely or substantially hides the primary power input 16 from view and generally hampers access to the primary power input 16, which is situated proximate the rear face 24 (see FIGS. 1-2). Therefore, without moving, uninstalling, or disassembling the appliance 10, which may be difficult or impractical at best, the primary power input 16 is inaccessible in the event of a power loss.

In contrast, the auxiliary power input 18, which is found on or near the front ace 20 or the side face 22 of the appliance 10, is readily accessible relative to the primary power input 16. Indeed, in some embodiments a user need only open the access panel 26 and draw forth the power plug 38 found at the end of the electrical cord 40. Therefore, should the primary power supply 30 of FIG. 1 fail, the auxiliary power input 18 may be quickly and easily electrically coupled to the auxiliary power supply 36 of FIG. 1 to provide electrical energy to the electrically-powered system 14 of the appliance 10.

In some embodiments as illustrated in FIG. 1, the appliance 10 is equipped with an electronic control unit 48 disposed within the housing 12. The electronic control unit 48 is employed to intelligently enable or disable, either consecutively or simultaneously, the primary power input 16 and the auxiliary power input 18 as conditions and circumstances warrant. For example, in some embodiments the electronic control unit 48 may be configured to automatically disable the auxiliary power input 18 when electrical energy is available from the primary power source 30 via the (primary power input 16. The electronic control unit 48 may also be configured to automatically disable the primary power input 16 when the auxiliary power input 18 is coupled to the auxiliary power supply 36 or when the auxiliary power input 18 is receiving electrical energy from the auxiliary power supply 36.

In some embodiments, the electronic control unit 48 may be configured to automatically enable the auxiliary power input 18 in response to a disruption in delivery of the electrical energy from the primary power input 16 or upon sensing a loss of power at the primary power supply 30. In addition, the electronic control unit 48 may automatically enable the auxiliary power input 18 when the auxiliary power supply 36 has power available and is electronically coupled to the auxiliary power input 18.

Figure 4:
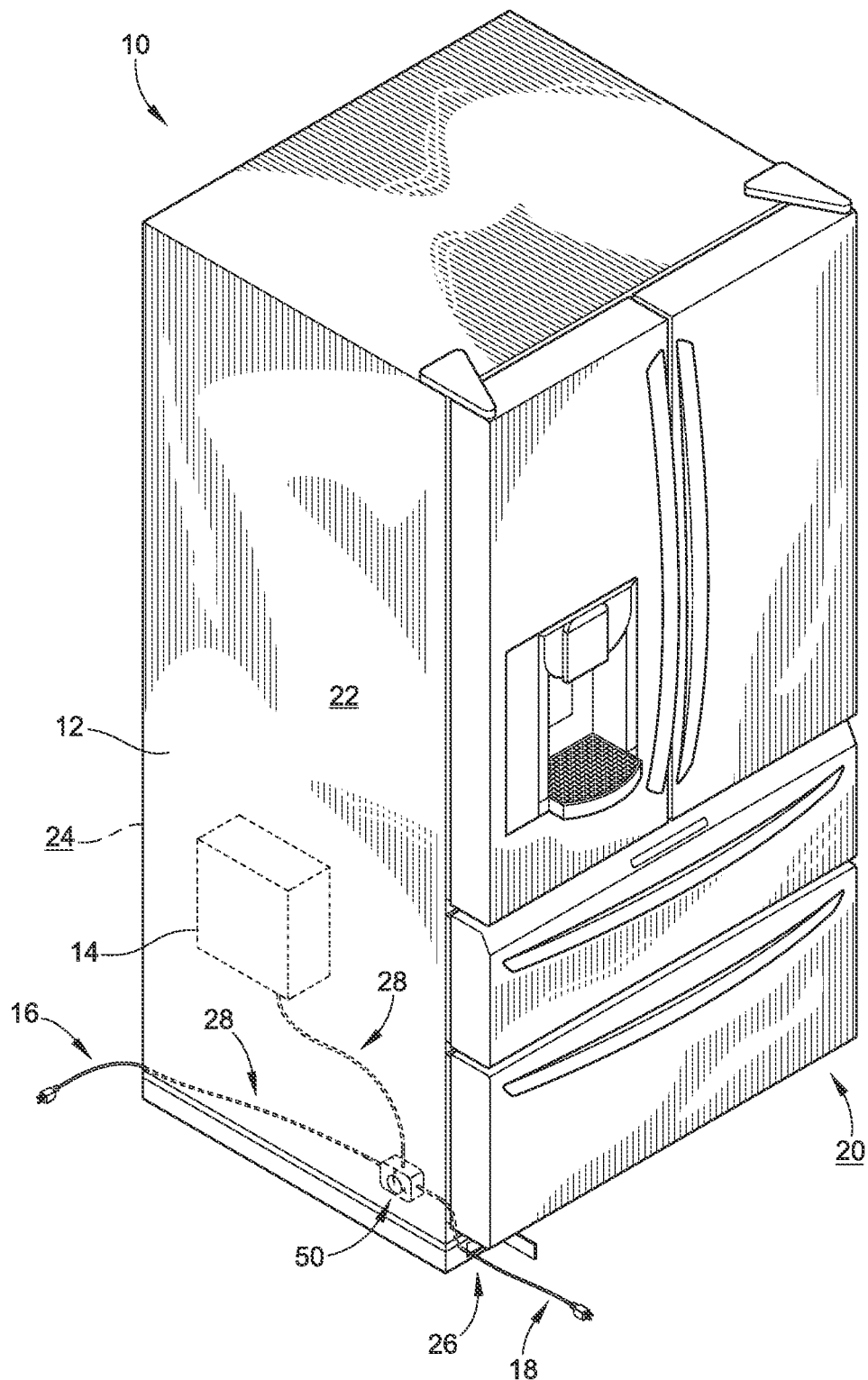
FIG. 4 is a perspective view of an embodiment of the appliance of FIG. 1 having a manual switch.

In some embodiments as show in FIG. 4, the appliance 10 includes a manual switch 50 disposed on the housing 12 proximate the auxiliary power input 18. The manual switch 50 is actuatable to simultaneously enable the auxiliary power input 18 and to disable the primary power input, and vise versa. The manual switch 50 may be a rotatable switch, a toggle switch, or another types of switch.

Referring back to FIGS. 1-2, in some embodiments the appliance 10 is outfitted with a retractable cord reel 52. The retractable cord reel 52, which is disposed within the housing 12, is suitable for selectively retracting the auxiliary power input 18 (e.g., the electrical cord 40 and power plug 38) into the housing 12 after use or when unused.

Figure 5:
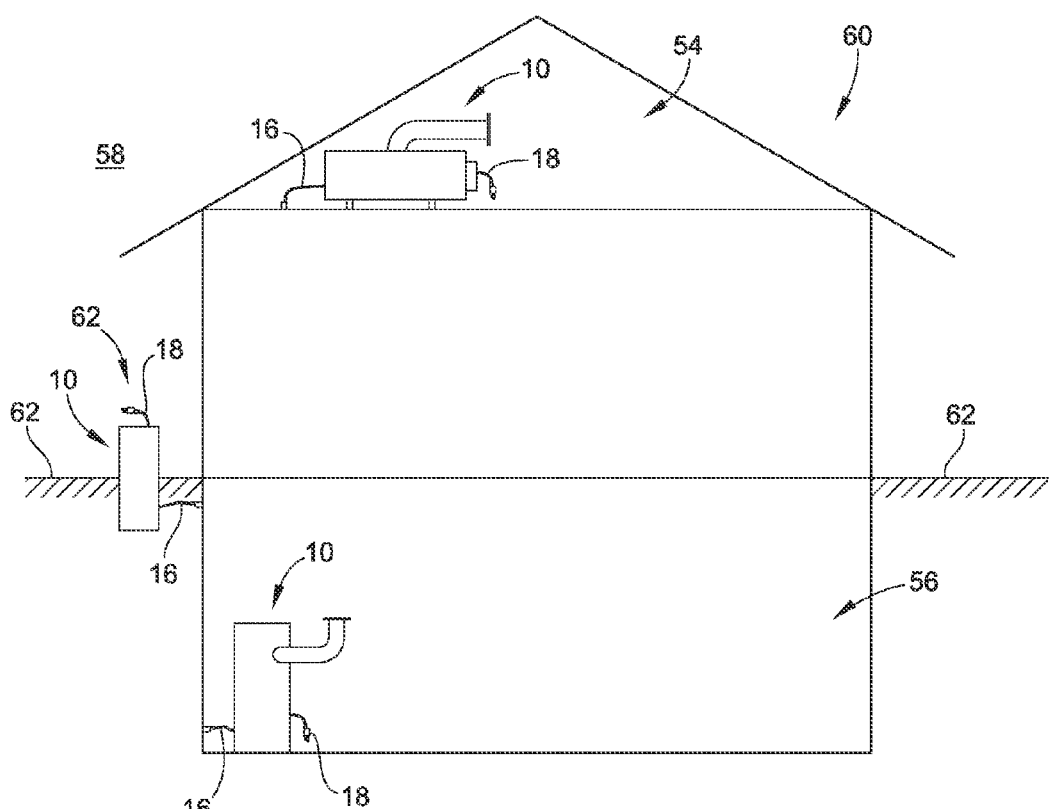
FIG. 5 is a simplified schematic of embodiments of the appliance of FIG. 1 installed in an attic, a basement, and outside a residential structure.

Referring now to FIG. 5, in some embodiments the appliance 10 comprises a furnace/air conditioning unit, in which the electrically-powered system 14 is a heating/cooling system. The appliance 10 is installed in an attic 54. Due to the limited space and structural impediments (e.g., rafters, walls, etc.) typically found in attics 54, the housing 12 generally hampers access to the primary power input 16. Therefore, without moving, uninstalling, or disassembling the appliance 10, which may be difficult or impractical at best, the primary power input 16 is inaccessible in the event of a power loss. However, the auxiliary power input 18 is readily accessible relative to the primary power input 16.

Still referring to FIG. 5, in some embodiments the appliance 10 comprises a water heater, in which the electrically-powered system 14 is a heating system. The appliance 10 is installed in a basement 56. Due to the limited space and structural impediments (e.g., studs, walls, small utility closets, etc.) typically found in basements 56, the housing 12 generally hampers access to the primary power input 16. Therefore, without moving, uninstalling, or disassembling the appliance 10, which may be difficult or impractical at best, the primary power input 16 is inaccessible in the event of a power loss. However, the auxiliary power input 18 is readily accessible relative to the primary power input 16.

In some embodiments the appliance 10 comprises a well pump, in which the electrically-powered system 14 is a pump mechanism or apparatus. The appliance 10, or a portion thereof, is installed outside 58 a residential structure 60 and at or below the surface of the ground 62. As such, the housing 12 generally hampers access to the (primary power input 16, which may be situated a substantial distance beneath the surface of the ground. Therefore, without moving, uninstalling, or disassembling the appliance 10, which may be difficult or impractical at best, the primary power input 16 is inaccessible in the event of a power loss. However, the auxiliary power input 18, which is found on or near a top face 62 of the housing 12, is readily accessible relative to the primary power input 16.

From the foregoing, those skilled in the art will appreciate that the appliance 10 is configured to enable auxiliary power to be quickly and easily electrically provided to the appliance in the event of a power loss. As such, food spoliation may be prevented, a comfortable temperature inside a residence may be maintained, or a supply of fresh water may be maintained despite the loss of primary power from a primary power supply.

What is claimed is:

1. An appliance, comprising:
an electrically-powered system supported by a housing;
a primary power input configured to supply electrical energy to the electrically-powered system, the housing generally hampering access to the primary power input after installation of the appliance; and
an auxiliary power input configured to supply electrical energy to the electrically-powered system, the auxiliary power input readily accessible relative to the primary power input after installation of the appliance.

2. The appliance of claim 1, wherein the housing defines a rear face and another face, the primary power input configured to extend from the rear face and the auxiliary power input configured to extend from the another face.

3. The appliance of claim 1, wherein the housing defines a front face having an access panel, the access panel providing access to the auxiliary power input hidden behind the access panel when not in use.

4. The appliance of claim 3, wherein the auxiliary power input is enabled when the access panel is placed in an open position.

5. The appliance of claim 3, wherein the auxiliary power input is enabled when the access panel is placed in an open position and disabled when the access panel is placed in a closed position.

6. The appliance of claim 1, further comprising a manual switch disposed on the housing proximate the auxiliary power input, the manual switch actuatable to simultaneously disable the primary power input and to enable the auxiliary power input.

7. The appliance of claim 1, further comprising an electronic control unit disposed within the housing, the electronic control unit configured to automatically disable the auxiliary power input when electrical energy is available from the primary power input.

8. The appliance of claim 1, wherein the auxiliary power input is a power plug disposed at a terminal end of a power cord.

9. The appliance of claim 8, further comprising a retractable cord reel suitable to retract the power cord and the power plug into the housing after use.

10. The appliance of claim 1, wherein the electrically-powered system is at least one of a heating system and a cooling system.

11. The appliance of claim 1, wherein the electrically-powered system is a pump.

12. The appliance of claim 1, wherein the housing is configured to be installed within at least one of a countertop and a cabinet.

13. The appliance of claim 1, wherein the housing is configured to be installed in at least one of a basement and an attic.

14. An appliance, comprising:
a housing defining a front face and a rear face;
an access panel disposed in the front face of the housing;
an electrically-powered system disposed within the housing;
a primary power input accessible from the rear face of the housing and configured to supply electrical energy to the electrically-powered system; and
an auxiliary power input disposed behind the access panel in the front face of the housing, the auxiliary power input configured to supply electrical energy to the electrically-powered system when accessed.

15. The appliance of claim 14, wherein the primary power input is disabled when the access panel is disposed in an open position.

16. The appliance of claim 15, wherein the auxiliary power input is enabled when the access panel is disposed in a closed position.

17. The appliance of claim 14, wherein the housing generally hampers access to the primary power input after installation of the appliance and wherein the auxiliary power input is readily accessible relative to the primary power input after installation of the appliance.

18. An appliance, comprising:
- a housing defining a front face and a rear face;
- an electrically-powered system disposed within the housing;
- a primary power input configured to supply electrical energy to the electrically-powered system, the housing generally hampering access to the primary power input after installation of the appliance;
- an auxiliary power input configured to supply electrical energy to the electrically-powered system, the auxiliary power input readily accessible relative to the primary power input after installation of the appliance; and
- an electronic control unit disposed within the housing, the electronic control unit configured to automatically disable the auxiliary power input when electrical energy is available from the primary power input.

19. The appliance of claim 18, wherein the electronic control unit is configured to automatically enable the auxiliary power input in response to a disruption in delivery of the electrical energy from the primary power input.

20. The appliance of claim 18, wherein the auxiliary power input is hidden behind an access panel in the front face of the housing when not in use.

\* \* \* \* \*